June 19, 1951     P. W. NIPPERT     2,557,308
APPARATUS FOR FORMING COMMUTATOR RINGS Filed April 28, 1949     5 Sheets-Sheet 1

Inventor
Paul W. Nippert

By W. S. McDowell
Attorney

June 19, 1951 P. W. NIPPERT 2,557,308
APPARATUS FOR FORMING COMMUTATOR RINGS
Filed April 28, 1949 5 Sheets-Sheet 3

Inventor
Paul W. Nippert
By W. S. McDowell
Attorney

June 19, 1951 P. W. NIPPERT 2,557,308
APPARATUS FOR FORMING COMMUTATOR RINGS
Filed April 28, 1949 5 Sheets-Sheet 4

INVENTOR.
Paul W. Nippert
BY
Schmeding, Wittman and Herbu
his Attorneys

June 19, 1951 P. W. NIPPERT 2,557,308
APPARATUS FOR FORMING COMMUTATOR RINGS
Filed April 28, 1949 5 Sheets-Sheet 5

INVENTOR.
Paul W. Nippert
BY
Schmeiding, Hittson and Gerber
his Attorneys

Patented June 19, 1951

2,557,308

UNITED STATES PATENT OFFICE 2,557,308

APPARATUS FOR FORMING COMMUTATOR RINGS

Paul W. Nippert, Columbus, Ohio

Application April 28, 1949, Serial No. 90,206
In Canada July 12, 1948

15 Claims. (Cl. 164—38)

The present invention relates to the construction of commutators for dynamo-electric motors, and more particularly to apparatus utilized in the formation of commutator annuli. This application is in part a continuation of my copending application Serial No. 754,428, filed June 13, 1947, and now abandoned.

In general, commutators used in electric motors comprise a plurality of radially positioned copper segments with relatively thin segments of insulation disposed between adjacent commutator segments. The individual segments of copper and insulation go to make up a circular annulus which is applied to a rotating shaft within the electric motor, and when so applied serves as a rotating surface adapted for frictional engagement with stationary commutator brushes. One of the primary difficulties in the construction of such commutator annuli lies in the uniting of the individual segments making up the annulus which, due to their radial position with respect to an associated rotating shaft, normally tend to be thrown apart or displaced by centrifugal forces set up during high speeds of rotation within the associated shaft. Also, it is prerequisite that the individual segments making up the commutator annulus be capable of withstanding wear caused by the frictional engagement with the associated commutator brushes, without becoming displaced relative to their proper radial position. Further, the segments of insulation disposed between adjacent commutator segments, must necessarily be held in a compacted state between adjoining segments to prevent the insulating material from becoming dislodged or displaced during rotation, as such displacement of the insulating material would necessarily tend to short circuit the commutator and render the same inoperative.

It is, therefore, an object of the present invention to provide apparatus for forming commutator annuli, wherein the individual commutator segment and insulation within the associated annulus are maintained in a highly compacted and true circular form, thereby providing for a relatively higher mechanical and electrical efficiency within the commutator.

It is another object of this invention to provide a machine for forming commutator annuli which is capable of relatively high speed operation in forming a multiplicity of commutator annuli from a single elongated sheaf of preassembled and alternately insulated commutator segmentforming bars, the machine functioning to effect the compression of the associated preassembled sheaf to compact individual segments and insulation into true circular form, at the same time applying to the individual annuli a continuous work ring which tends to hold the individual segments of the annulus for subsequent operation necessary in the application of a permanent fastening means to the annulus, and to sever individual portions of the sheaf into circular commutator annuli.

Further objects and advantages of the present invention will be apparent from the following description, reference being had to the accompanying drawings wherein preferred forms of embodiments of the invention are clearly shown.

Referring now more particularly to the drawings, it will be seen that the embodiment of the present invention disclosed in Figs. 1 to 10 therein makes use of a base or bed frame 10 provided at its respective ends with a pair of upstanding and horizontally spaced end members 11 and 12, respectively. The end members support three longitudinally extending and triangularly spaced cross bars 13 substantially at the upper ends of the end members. These cross bars 13 are secured within the end members by means of threaded nuts 14, which aid in the convenient disassembly of the frame and for access to the various members supported upon the cross bars, which are to be hereinafter more fully described.

Rigidly mounted upon the cross bars 13, substantially intermediate the two end members 11 and 12, is a casting 15 which possesses a generally triangular configuration, and which is formed with a pair of longitudinally disposed openings, in which are positioned circular anti-friction bearings 16. Rotatably supported within the anti-friction bearings 16 is a relatively elongated tubular magazine 17 which is provided upon its outer surface with a multiple belt-receiving pulley 18. The tubular magazine 17 is held within the anti-friction bearings against longitudinal movement by means of suitable bushings indicated by the numeral 19. The magazine 17 is formed with a longitudinally extending circular cross-sectional bore or chamber 20 which is adapted to receive a work tube 21 which frictionally retains an elongated sheaf of preassembled commutator segment-forming bars 22, in which the bars are alternately separated by mean of insulation material positioned between adjacent bars. To compensate for the various sizes and diameters of the work tubes 21 positioned within the chamber of the magazine, a spacer tube 23 is advantageously positioned within the magazine to insure relatively snug fitting and exact axial positioning of the work tube and its associated sheaf. Access is gained to the bore of the rotatable magazine through its open rearward end, whereby the work tube containing the sheaf of commutator bars may be inserted within the bore. Carried at the forward end of the rotatable magazine, by means of a threaded collar 24, is an adapter or nozzle 25 which is formed with an axially disposed and outwardly tapered bore or restricted throat 26, the inner opening of which corresponds in diameter to that of the preassembled sheaf 22, and the outer opening of the throat corresponding in diameter to that desired or required of the finished commutator annulus. It will be seen, that due to the tapered throat 26, the portion of the sheaf 22 passing through the throat will undergo a diameter reduction and consequent compaction of the individual and relatively loosely assembled bars and insulating strips. The component parts making up the complete magazine assembly, are disposed in coaxial relation to one another, to insure proper alignment of the sheaf with the inner end of the restricted throat 26. Rotation is imparted to the magazine 17 by means of an electric motor 27 positioned upon the bed frame 10, and driving by means of a multiple pulley 28, a plurality of V-belts 29 which are drivingly connected with the multiple pulley 18 carried by the magazine.

Hingedly mounted upon the rearward base cross bar 13, are a pair of spaced cradle arms, 30 and 31 respectively. Each of the arms are provided with inwardly extending U-shaped straps or clamping brackets 32 which encircle and rigidly hold in longitudinal order a hydraulic cylinder 33. Each of the arms 30 and 31 is provided with an arcuate recess 34 substantially at its upper end, which recess engages the outer surface of the upper cross bar 13, when the arms are in a past-center position with respect to their pivotal support. In this position the associated hydraulic cylinder 33 is disposed in adjacent axial alignment with the bore of the rotatable magazine 17. The rear end of the cylinder 33 is disposed in substantially abutting relationship to the inner face of the end member 11 of the frame, and is provided with a longitudinally extensible ram or shaft 35, which upon actuation of the cylinder in one direction, will enter the breech end of the magazine, and engage the rearward end of a sheaf of bars 22 to force the same outwardly through the restricted throat 26. It will be understood, that the cylinder 33 is of the double acting two-stage type, being provided internally with a chamber containing a slidable piston 36 which carries the inner end of the shaft 35, and which is movable in response to the flow of fluid under pressure introduced at the respective ends of the cylinder, in either direction. Fluid under pressure of a hydraulic pump 37, driven by a second electric motor 38 is introduced to the cylinder 33 by way of a pair of flexible conduits, 39 and 40 respectively, disposed at the opposite ends of the cylinder. The flexibility of the conduits 39 and 40, allow the limited swinging movement of the cylinder 33 upon its associated hingedly mounted bars 30 and 31, and the swinging movement of the cylinder may be easily accomplished by means of a manually operated handle 41 disposed at the upper end of the hingedly mounted bar 31, it being understood that the cylinder 33 must first be swung out of axial position with respect to the magazine, before the latter may be charged with a sheaf of commutator bars.

A second relatively larger hydraulic cylinder 42 is rigidly secured to the end member 12 of the frame in spaced relation to the throat-end of the rotatable magazine 17, and is disposed in axial alignment with the bore thereof. The cylinder 42 is secured within the end member 12 by a rearwardly extending tubular extension 43 formed integral with the cylinder, and passing through an opening formed in the end member 12. The ends of the cylinder 42 are formed with axially disposed and suitably packed openings which slidably receive a pair of shafts 44 and 45, respectively, the latter being joined axially of a circular piston 46 disposed in wiping engagement with the inner walls of the cylinder 42. The cylinder 42 functions in a manner similar to that of the cylinder 33, in that its associated piston 46 is reversably movable longitudinally of the cylinder in response to the flow of fluid introduced under pressure at the respective ends of the cylinder. The shaft 44 carried by the piston 46 of the second cylinder 42 is formed with an axial recess 47 substantially at its outer end, and this recess serves to receive a cylindrical shank 48 which is formed integral with a ring-receiving socket adaptor 49. The shank 48 is attached to the shaft 44 by a threaded rod introduced axially of the two shafts 44 and 45, and the end portion of which extends within the recess for threaded engagement with a cooperatively threaded socket formed in the rearward portion of the shank.

Figure 8:
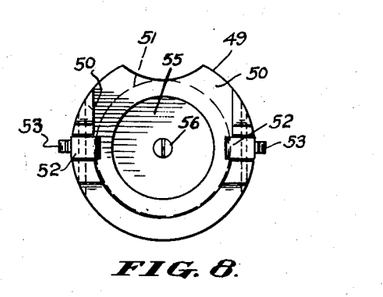
Fig. 8 is an end elevational view of the work ring carrying adapter disclosed at the end of the second fluid-actuated cylinder.
Figure 9:
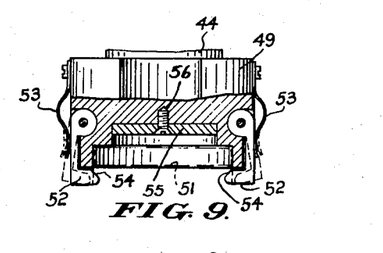
Fig. 9 is a top plan view, partially in horizontal section of the socket adapter.

The adapter 49 is formed at its forward face with a slotted recess 50 which is open at its upper end, and receives a circular and continuous work ring 51 which is provided with an axially disposed circular opening whose diameter corresponds with the diameter of the finished commutator annulus. Referring particularly to Figs. 8 and 9 of the drawings, it will be noted that the forward end of the adapter 49 is provided with a pair of oppositely disposed hingedly mounted pawls 52 which are maintained by means of bow springs 53 in a position extending slightly inwardly of the forward end of the socket 50, in order that a work ring 51 positioned within the socket may be maintained therein and prevented from longitudinal dislodging movement. The tips of the pawls 52 are beveled as at 54 in order that the associated work ring 51 may be withdrawn under some force from the outer end of the socket 50.

Figure 5:
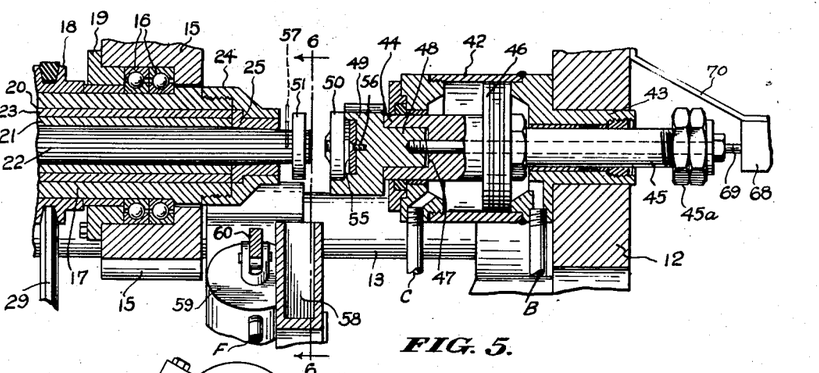
Fig. 5 is an enlarged detailed vertical sectional view taken through the magazine and work ringapplying mechanism, and disclosing a sheaf of commutator bars undergoing diameter reductions and compaction within a restricted throat disposed at one end of the magazine.

The socket 49 is movable longitudinally of the assembly, upon actuation of the cylinder in one direction, to a position closely abutting the discharge end of the restricted throat 26, and as a sheaf of commutator bars 22 is forced outwardly under action of the first hydraulic ram 33 work ring 51, being held in axial alignment by the socket adapter 49, is positioned around the periphery of the compacted and compressed portion of the sheaf, as particularly shown in Fig. 5 of the drawing. As the flow of fluid is reversed in the second cylinder 42, the socket adapter 49 will be drawn backwardly away from the extruded portion of the sheaf 22, and at the same time releases the work ring 51 which is now held in frictional engagement with the peripheral surface of the extruded portion of the sheaf. The position of the work ring 51 with respect to the extruded portion of the sheaf 22 is controlled by a circular spacer plate 55 which is positioned within a recess formed adjacent the slot 50 of the socket adapter 49. This spacer plate 55 is detachably secured within its recess by a threaded screw 56 which is maintained in threaded engagement with the adapter 49, and to vary the position of the work ring 51 with respect to the end of the sheaf 22, the spacer plate 55 may be replaced by a similar plate of different thickness, whereby the compacted end of the sheaf of segment-forming bars which abuts this plate, may extend a desired distance beyond the work ring.

The length of extension of the socket adapter 49 determines the extent of the protrusion of the compacted end of the sheaf 22 from the nozzle 26; this necessarily follows due to the difference in size of the two cylinders 33 and 42, as fluid under equal pressure will exert a greater force upon the relatively larger piston 46 of the cylinder 42, than will be exerted upon the smaller piston of the cylinder 33, and therefore, when the forces of the two cylinders oppose one another, the sheaf of bars 22 is held against further protrusion than allowed by the limiting force exerted by the cylinder 42. The length of extension of the socket adapter is controlled by a pair of stop nuts 45a which are carried in threaded engagement with the outer end of the shaft 45, and which are adjustable longitudinally of the shaft to vary their spacing with respect to the end of the stationary extension 43. Upon extension of the socket adapter 49, these stop nuts strike or engage the stationary extension 43 to limit the distance of extension.

Figures 6, 7:
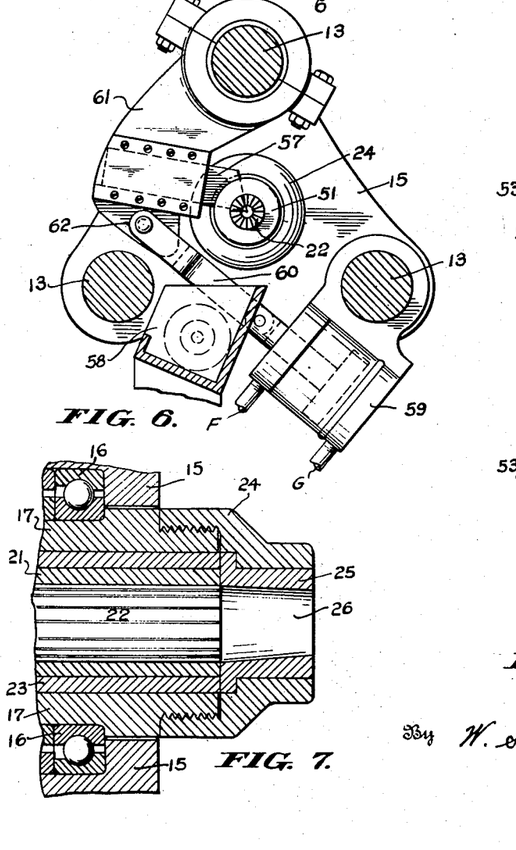
Fig. 6 is a vertical sectional view taken along the line 6—6 of Fig. 5.
Fig. 7 is an enlarged vertical sectional view taken through the restricted throat assembly used in the diameter reduction of the associated commutator-forming sheaf.

After the work ring 51 has been placed upon the periphery of the compacted end of the sheaf, and the second ram 42 has been retracted, rotation of the magazine, and the sheaf 22 carried thereby, is effected by the electric motor 27 and its associated driving belt and pulley, whereupon a longitudinally fixed but transversely movable cutting tool 57 is brought into engagement with the exposed and compacted portion of the sheaf between the end of the restricted throat 26 and the work ring 51, and as the cutting tool 57 is moved inwardly toward the center of the sheaf, the end portion thereof is severed from the remaining body portion, as illustrated in Fig. 6 of the drawings, and dropped by gravity downwardly into a deposit slot 58 positioned below and in vertical alignment with the work ring 51. The transverse movement of the cutting tool 57 is effected by means of a fluid actuated ram 59 mounted upon the rearward base cross bar 13, and linked to the cutting tool by means of a connecting rod 60. The cutting tool 57 is rigidly carried by an arm 61 which is pivotally mounted upon the upper cross bar 13 for swinging movement in a transverse plane, the outer end of the link 60 being pivotally connected, as at 62, with the lower or dependent end of the arm 61. The third fluid-actuated ram 59 is also of the two stage double acting type, with the extension and retraction of the link 60 being effected by the flow of fluid under pressure introduced to the respective ends of the associated cylinder of the ram. Cutting engagement between the cutting tool 57 and the associated end of the sheaf 22 is effected by the retraction of the ram 59, serving to lock the arm 61 about its pivot point, and to bring the cutting edge 57 transversely across the compacted end of the sheaf 22. The penetration of the cutting tool 57 is limited to a position approximating the center or axis of the exposed portion of the sheaf, and as the latter is undergoing rotation at relatively high speeds, the portion of the sheaf retained within the work ring 51 is quickly and evenly severed from the remaining body portion thereof.

Figure 2:
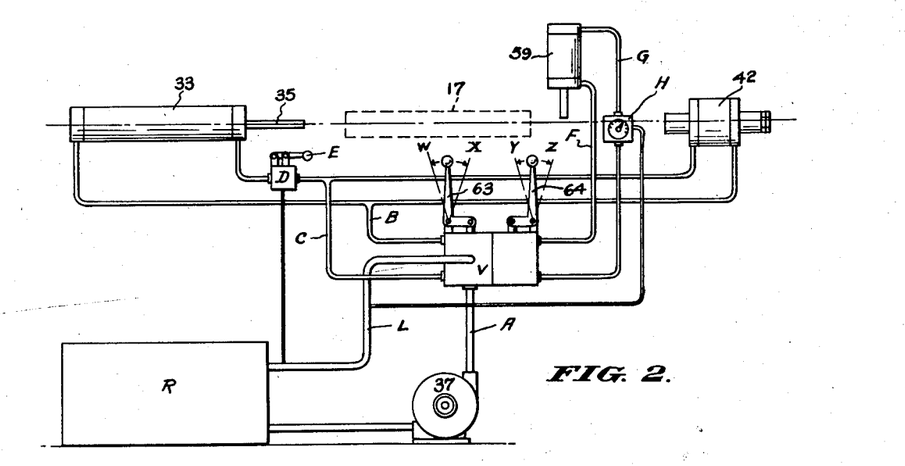
Fig. 2 is a diagrammatic view of the hydraulic system associated with the machine disclosed in Fig. 1.
Figures 3, 4, 10:
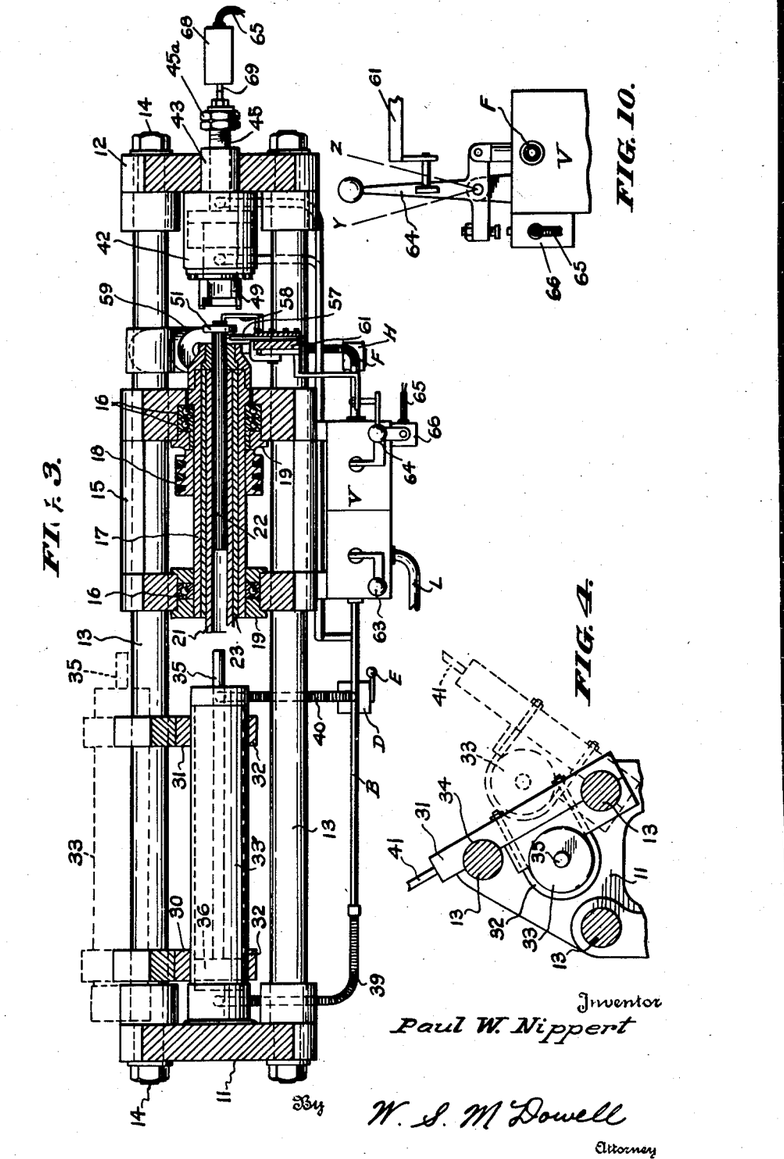
Fig. 3 is a longitudinal horizontal sectional view taken along a plane indicated by the line 3—3 of Fig. 1.
Fig. 4 is a vertical sectional view taken along the line 4—4 of Fig. 1.
Fig. 10 is a detailed elevational view of the manually operated control for the cutting mechanism embodied in the machine.

Referring now particularly to Fig. 2 of the drawings, which illustrates diagrammatically the hydraulic system associated with the present invention, the letter R designates a fluid reservoir of suitable capacity, from which fluid is introduced by gravitational flow to the pump 37 driven by the electric motor 38. The pump 37 in turn supplies fluid under pressure to a manifold valve V by way of an inlet conduit A. The manifold valve V is provided with a pair of manually operable control levers 63 and 64, respectively. Each of the control levers are movable in three positions, as indicated by dotted lines in Fig. 2, and are normally maintained in their neutral positions under spring tension, at which positions the entire system is stabilized, with the pump 37 supplying fluid under pressure to the manifold valve V, which in turn allows the fluid to be exhausted to a return line L to the reservoir R. The lever 63 serves to control the operation of the hydraulic rams 33 and 42, whereas the lever 64 actuates only the ram 59 which controls the transverse movement of the cutting tool 57. In sequence of operation, after the rotatable magazine 17 has been charged with a preassembled sheaf of commutator bars, and the cylinder 33 moved to its position in axial alignment with the magazine, is as follows: The control lever 63 is first moved to a position designated by the broken line X in Fig. 2, which causes the valve V to direct fluid from the pump 37 to a supply conduit B which communicates at its outer ends with the rearward ends of the rams 33 and 42, thus supplying fluid pressure to effect the inward extension of the rams; at the same time, fluid on the opposite sides of the respective pistons is returned to the valve V by way of a conduit C communicating with the opposite ends of the rams, the return fluid in turn being transferred ultimately back to the reservoir R. As fluid reaches each of the rams 33 and 42, the same will extend, with the larger ram 42 extending first, due to the larger cross sectional area of its associated pistons, and will thus function to position the work ring 51 carried thereby in axial alignment with the discharge end of the magazine 17, and as the ram 33 extends, the same will enter the bore of the magazine to engage the rear end of the sheaf of commutator bars 22 to force a portion of the same outwardly through the restricted throat 26, and through the associated work ring 51 carried by the second ram 42, at which time the extension of the ram 33 is terminated by the force of the ram 42 which has reached its limit of extension. After insertion of the compacted end of the commutator sheaf within the associated work ring 51, the lever 63 is swung to its opposite position indicated by the line W whereupon the valve B functions to reverse the flow of fluid to the individual rams to effect the retraction thereof. It will be understood that the retraction of the ram 33 from within the rotatable magazine 17 is unnecessary as long as the latter is charged with a sheaf of bars, and to this end a manually controlled check valve D is interposed within the conduit C at the return side of the ram 33, and serves to curtail or restrict the flow of fluid into the opposite or inner end of the ram 33 from the valve V, in order that the retraction of the ram 33, upon the reversal of the flow of fluid through the valve V, will not take place with each cycle of retraction of the ram 42, the retraction of the ram 33 being accomplished only when it is necessary to recharge the magazine 17, and then by the operation of the associated hand lever E which serves to open the valve V to effect reversal of the ram 33. It will be here understood that the necessity for retracting the ram 33 occurs only when it is necessary to recharge the magazine 17, and by eliminating the retraction of the ram 33 with every cycle of retraction within the ram 42, the time required for the movement of the relatively slow acting ram 33 will be saved in the over-all operation, which will be limited only to the time required for the extension of the ram 42 and the relatively slight extension of the ram 33. As before stated, the manually operable lever 64 serves to control the operation of the hydraulic ram 59, and functions independently of the operation of the longitudinal rams 33 and 42. To effect the movement of the associated cutting tool 57 into engagement with the compacted ends of the commutator bars 22, the lever 64 is moved to a position indicated by the line Y, whereupon fluid under pressure of the pump 37 is introduced to the inner end of the ram 59 by way of the conduit F, and at the same time fluid disposed at the opposite side of the associated piston of the ram is vented through a return conduit G, and eventually to the fluid reservoir R. The return conduit G is provided with a restrictor valve H which functions to slow or decrease the flow of fluid from the outer end of the ram 59 to the valve V, in order that a relatively slow movement of the cutting tool 57 carried by the ram may be obtained. To extend the ram 59, and to return its associated cutting tool to its normal position, the lever 64 is moved to a position indicated by the line Z, whereupon the reversal of the flow of fluid to the ram 59 is effected in order to move the cutting tool out of alignment with the associated compacted ends of the commutator bars. Upon reversal of the flow of fluid to the ram 59, the restrictor valve H allows free passage of the fluid from the valve to the outer end of the ram 59 in order that a quick and positive movement may obtain within the return movement of the cutting tool.

Figure 1:
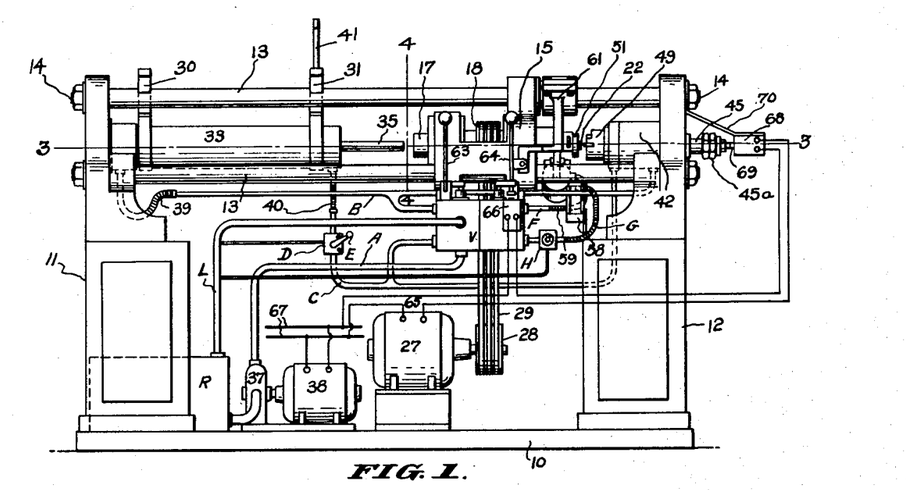
Fig. 1 is a front elevational view of a commutator forming machine constructed in accordance with the present invention.

In addition to operating the ram 59, the manually controlled lever 64 also serves to control the electrical circuit, indicated by the numeral 65, for the electric motor 27 which serves to impart rotation to the magazine 17. The circuit 65 to the electric motor is closed upon movement of the lever 64 to its position effecting the retraction of the ram 59 and the engagement of the associated cutting tool 57 with the sheaf of commutator bars, the lever 64 serving to engage and depress an electrical switch 66 in order to effect the flow of electrical current from a trunk circuit 67 to the motor. In addition to the switch 66, a second switch 68 is interposed in the circuit of the electric motor 27, and is positioned rearwardly of the shaft 45 of the second ram 42. This switch 68 is carried upon a bracket 70 extending outwardly from the end member 12 of the frame, and is disposed in axial alignment with the outer ends of the shaft 45 in order that the latter in its fully retracted position will engage a resilient plunger 69 of the switch to effect the proper closure of the circuit. This provision is made to insure the complete retraction of the second ram 42 prior to rotation of the magazine 17, in order that the socket may be fully drawn away from the subsequently rotating commutator sheaf. As the lever 64 is returned to its neutral position, or to a position effecting the extension of the ram 59, the circuit of the electric motor 27 is thus opened to discontinue rotation of the magazine 17. Referring to Fig. 1 of the drawings, it will be seen that the electric motor 38 which drives the fluid pump 37 also derives its force of power from the trunk line or main power circuit 67.

To summarize the operation of forming commutator annuli by means of apparatus disclosed in the drawings, the elongated tubular sheaf of preassembled and alternately insulated commutator bars which is disposed within the tubular work tube 21 to prevent disassembly, is introduced to the rotatable magazine 17 by way of its open rearward end, with the first hydraulic ram 33 in its fully retracted position, and after the latter has been swung out of axial alignment with the magazine. After the magazine 17 is charged with the sheaf of commutator bars, the ram 33 is returned to its axial alignment position with respect to the magazine by means of the manually operated lever 41. Next the lever 63 which controls the operation of the rams 33 and 42 is moved to its position effecting the extension of the rams, whereupon the ram 42 precedes the extension of the ram 33, in order to position the work ring 51 in adjacent axial alignment with the restricted opening of the throat 26, substantially simultaneous with this operation is the extension of the ram 33 to engage the rearward end of the sheaf of commutator bars 22 and to force a portion thereof through the restricted throat and through the associated work ring 51, thereby effecting a compression or compaction of the individual segments of the sheaf and a consequent reduction in the outer diameter thereof, at the same time the compacted end of the sheaf is inserted within the work ring in order that subsequent finishing operations may be easily accomplished without fear of disassembly of the annulus. After extrusion of the end portion of the sheaf, the ram 42 is retracted by rocking the lever 63 in the opposite direction and held in this position to insure engagement of the outer end of the shaft 45 with the safety switch 68, actuation of the lever 64 is then effected to a position closing the electrical circuit of the motor 27 and effecting rotation of the magazine 17, and at the same time effecting the retraction of the third ram 59, in order that the cuting tool 57 is moved transversely across the open end of the restricted throat 26 and into engagement with the compacted portion of the sheaf of commutator bars, at which time the severance of the end portion of the sheaf is effected to produce a commutator annulus which is deposited within the access slot 58, from whence the annulus may be removed for further and subsequent finishing operations. At this point, the cycle of operation is repeated to force a second portion of the sheaf through the restricted throat, and in a like manner to produce a second commutator annulus held within a work ring.

Another aspect of the present invention lies in using a rotating cutting tool such as a saw while imparting relative movement between the sheaf and the rotating cutting tool, i. e., one may be moved relative to the other during the severing operation to form the annulus. In the form of embodiment shown in Figs. 11 to 15, the sheaf is held stationary and a saw is moved transversely of the axis of the sheaf to sever the sheaf into annuli.

Referring in detail to the structure shown in Figs. 11 to 15, the bed plate 110 carries upright end members 111 and 112 which carry a cross bar 113. The bar 113 is threaded at its ends and extending through the end members 111 and 112. Shoulders 171 are formed on the bar which shoulders abut the inner side of the end members. Nuts 114, when tightened, hold the bar 113 in position on the end members.

Another upright member 172 is also suitably secured to the bed plate 110. Members 111 and 172 support a horizontally disposed cylinder 133 containing a plunger or piston 136 which actuates a ram 135. The opposite ends of the cylinder are connected with hydraulic tubes 139 and 140.

A frame 174, including spaced uprights 175 and 176 and a connecting yoke 178, is also suitably carried by the bed plate 110. The frame 174 is interposed between uprights 172 and 112. These uprights are bored, as at 179 and 180, respectively, which bores are in axial alignment with the cylinder 133 and ram 135. The left side of upright 176 is counter-bored, as at 181, to form a circular shoulder 182. The material, of upright 175, above and through the diameter of bore 179 is cut away to form a slot 184 (see Fig. 14).

A sheaf work tube or magazine 185 is received by the bores 179 and 180. This tube is formed with a circular flange portion 186 forming a shoulder 187, which when in operative position, abuts shoulder 182 of upright 176. The portion of 189 of tube 185, to the right of flange 187, snugly fits but is slidably mounted in the bore 180. The left end of tube 185 rests within the bore 179. Tube 180 is held in operative position in frame 174 by a clamp 188, which includes a lever 231, pivotally carried by a bolt 190 secured in the top of upright 175. One end of the lever is provided with an operating knob 191 and the other end 192 bears upon the top of tube 185. To insert a tube in working position in frame 174, the lever 231 is moved so that the end 192 thereof is moved from overlying the slot 184. A tube 185 is then lowered so that its rests in the bottom of the slot, i. e., the bore 179 and upon a rest 194 which extends upwardly of the yoke 178 of frame 174. Then the tube 185 is slid to the right whereby tube portion 189 enters bore 180 and shoulder 187 of flange 186 abuts shoulder 182 in the upright 176. The knob 191 is then swung approximately 90° whereby end 192 of lever 189 bears tightly downwardly on the tube 185.

Tube 185 carries the sheaf 196 of commutator segments and insulation strips therebetween. The bore 197 of tube 185 may be tapered slightly throughout its length, the diameter tapering to smaller dimensions toward the right. The segments of strips of copper and insulation forming the sheaf are pressed, preferably by a hydraulic press, into the tube 185 before the tube is inserted into the frame 174.

When hydraulic pressure is applied through tube 139 on the left side of piston 136, the ram 135 will engage the left end of sheaf 196 and force the sheaf to the right and out of the right end of tube 185. The extruded end of sheaf 185 is received by the work ring 51.

The work ring 51 in this embodiment of the invention is carried by the left end 149 of a work ring holding rod or ram 144. Ram 144 is freely slidable in a close fitting sleeve 143. Bosses 199 and 200 are formed integrally with upright 112 and extend in axial alignment with the tube 185 and ram 135. These bosses and the upright 112 are provided with a bore 201 in axial alignment with tube 185 for receiving the axially aligned sleeve 143. Parts of the sleeve 143 are externally threaded for receiving nuts 203 and 204 for clamping the sleeve to the upright 112. By loosening the nuts 203 and 204 and then shifting the sleeve axially and by retightening the nuts, the sleeve can be held in any desirable position with respect to the upright 112.

The left end of sleeve 143 is provided with a longitudinally extending slot 205 and the extreme end is circumferentially notched, as at 206, which merges with slot 205. A radially extending rod 208 is suitably secured to ring holding ram 144 and is disposed for to and fro movement in slot 205 when aligned therewith. The outer end of rod 208 carries a knob 209 by which ram 144 may be shifted axially while the rod 208 is in slot 205. The knob 209 is also utilized for rotating the rod 208 to move the latter into the notch 206 of sleeve 143. The sleeve forms a shoulder 210 for engagement with rod 208 when the rod is moved downwardly. Thus when the rod 208 is in its lower position, the ring holding ram 144 is prevented from moving to the right.

The right end 145 of ram 144 is smaller in diameter and is threaded at the end to receive a nut 145a. A coil spring 212 surrounds the reduced end 145 and is interposed between a retaining washer 213, which latter abuts the end of sleeve 143, and the nut 145a. The spring normally urges ram 144 to the right. When arm 208 is turned so as to align with slot 205 in sleeve 143, spring 212 will move ram 144 to the right until rod 208 engages the wall of the sleeve forming the end of the slot.

The left end of ring holding ram 144 is provided with a recess of small diameter for receiving the spacer plate 55, held in position by a screw 215, and provided with a larger recess or socket 50 for receiving the work ring 51. The socket 50 is axially aligned with the sheaf 196 so that the hole therein is aligned with the sheaf. Preferably the hole in the ring is of slightly smaller diameter than the outside diameter of the sheaf so that the diameter of the sheaf is slightly further contracted when forced into the hole in the ring. The metal of the ring at opposite ends of the hole is cut away slightly so as to provide a radially inwardly turning cam surface for contracting the sheaf.

The right end of sheaf 196 is forced through the hole in ring 51 until it engages the spacer plate 55. At this time the ring holding ram is held stationary since rod 208 is in abutting relation with shoulder 210 in sleeve 143. Since the ram can move no farther to the right, the hydraulic fluid escapes through a relief valve. The operator then turns off the pressure on the left side of piston 136.

The operator then severs the sheaf intermediate the right end of tube 185 and the left side of ring 51 by causing relative movement to be imparted between the sheaf 196 and a cutting tool 157. In the detailed aspect of the invention as herein shown, a saw is moved across the sheaf. The saw 157 herein shown is of the rotating type, revolving about an axis parallel with the axis of the sheaf. The shaft 217 is journalled in a bearing 218 on the free end of a pivotally mounted arm 219. The hub 220 for arm 219 is journalled on the cylindrical bar 113. Shaft 217 is driven by a pulley 222 which in turn is driven by a belt 223 connected with the pulley 224 of an electric motor 159. Motor 159 is suitably secured to and carried on a platform 226. Platform 226 is formed integrally with an arm 227 which latter is formed integrally with hub 220 and arm 219. A handle 228 is suitably secured to the platform 226 for rocking the motor-saw assembly about bar 113.

Upright 176 extends above bar 113 and is drilled to receive the bar to provide an additional support for the bar, adjacent the journal portion thereof for hub 220. The journal portion is disposed on the right side of the upright 176 and the portion of the bar on the left side of upright 176 is threaded to receive an adjusting nut 230.

Figure 11:
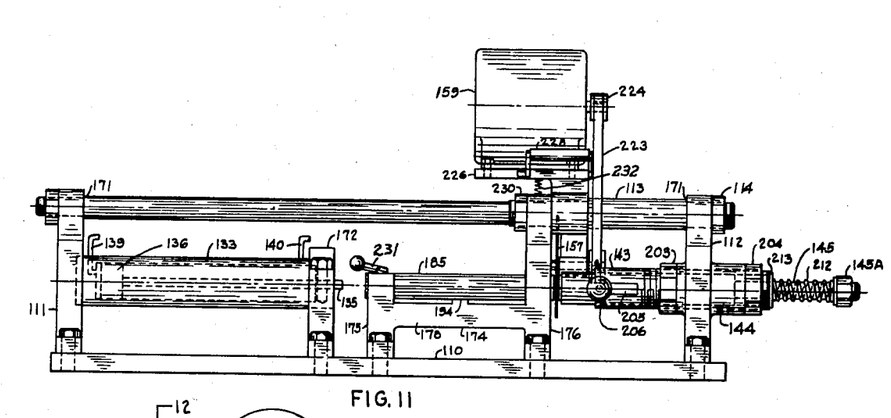
Fig. 11 is a front elevational view of another form of the invention.
Figure 12:
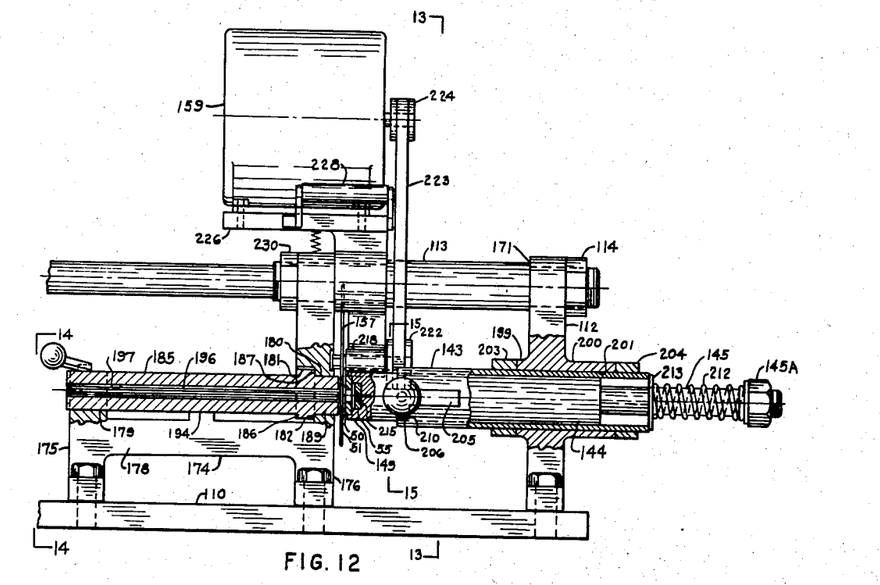
Fig. 12 is a view, on a larger scale and partly in section, the section being taken on line 12—12 of Fig. 13.
Figure 13:
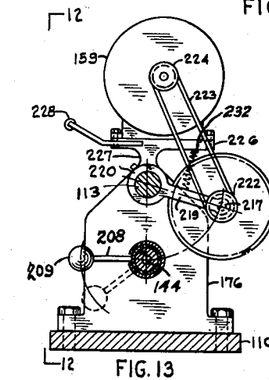
Fig. 13 is a view partly in section, the section being taken on line 13—13 of Fig. 12.
Figure 14:
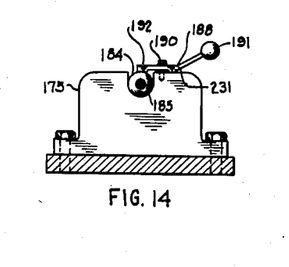
Fig. 14 is an end view of the sheaf tube support and locking clamp for the tube, the view being taken on line 14—14 of Fig. 12.
Figure 15:
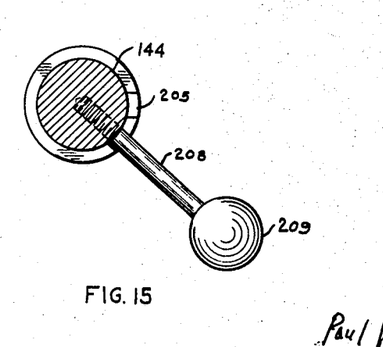
Fig. 15 is a section view of the work ring holding ram and the guiding sleeve therefor, the section being taken on line 15—15 of Fig. 12.

When the handle 228 is pushed rearwardly as viewed in Figs. 11 and 12 or to the right as viewed in Fig. 13, the saw will be moved to and through annulus cutting positions. After the annulus is severed, the saw is returned to the position shown in Fig. 13. A compression spring 232 is interposed between the motor platform 226 and the upright 176 for normally urging the motor-saw assembly to the position shown in Fig. 13.

When the annulus severing is complete and the saw returned to the position shown in Fig. 13, the operator then lifts upwardly on arm 208. The spring will then retract ram 144. The operator then removes the work ring-annulus assembly and inserts another ring 51 in position in socket 50. Then again fluid under pressure is admitted to the cylinder 133 on the left side of piston 136.

The length of the annulus severed can be adjusted by axial adjustment of sleeve 143. Also the length of the annulus protruding from the ring 51 can be varied by substituting thinner or thicker spacer plates 55.

In view of the foregoing, it will be seen that the present invention provides both a mechanically efficient and positively acting machine for forming individual commutator annuli from a preassembled sheaf of commutator segments, the same being characterized by its relatively high speed operation and its ultimate production of commutator annuli, which, by nature of their compacted formation, provide superior commutators upon final assembly. It will be understood, that the annuli which are formed by the present apparatus form the basis for a finished commutator, but it is necessary that the same undergo subsequent finishing operation in order that the individual segments may be mechanically united, and the work ring 51 removed from the peripheral surface thereof.

While the forms of embodiments of the present invention as herein disclosed constitute preferred forms, it is to be understood that other forms might be adopted, all coming within the scope of the claims which follow.

I claim:

1. Apparatus for forming commutator annuli comprising a frame, a tubular magazine mounted on said frame for rotational movement about its longitudinal axis, said magazine being formed with a tubular chamber adapted for the reception of an elongated tubular sheaf of segment-forming bars, said magazine being formed at one end with a longitudinally tapered restricted throat communicating with one end of the chamber, means for imparting rotation to said magazine, a fluid-actuated ram hingedly mounted on said frame and movable into and out of axial alignment with respect to said magazine, said ram being provided with a longitudinally extensible shaft adapted when brought into axial alignment with said magazine and upon actuation to enter the chamber formed in said magazine to force a portion of a sheaf of bars contained therein outwardly through the restricted throat, and a second fluid-actuated ram disposed in axial alignment with said magazine adjacent said throat, said second ram being provided with a longitudinally extensible socket adapted to receive a work ring and adapted upon actuation to position a work ring contained in the adapter in registration with said throat to cause the portion of a sheaf being forced therethrough to be inserted in the central opening of the work ring, and a transversely movable cutting edge disposed substantially adjacent the throat end of said magazine, said cutting edge serving upon rotation of said magazine to transversely sever the portion of a sheaf forced through said throat from the body portion thereof to form a commutator annulus.

2. Apparatus for forming commutator annuli comprising a frame, a tubular magazine mounted on said frame for rotational movement about its longitudinal axis, said magazine being formed with a tubular chamber open at one end to receive an elongated tubular sheaf of commutator segment-forming bars and communicating at its opposite end with a longitudinally tapered restricted throat, means for imparting rotation to said magazine, a fluid-actuated longitudinally extensible ram hingedly mounted on said frame for swinging movement to a position in axial alignment with the chamber of said magazine, said ram serving when so positioned and upon actuation to enter the chamber of said magazine to force an end portion of a sheaf of bars positioned therein outwardly through said throat, a second fluid-actuated ram mounted substantially adjacent the throat of said magazine in axial alignment therewith, a socket adapter carried at the end of said second ram and movable in response to the actuation of the latter into registration with the throat-end of said magazine, said adapter serving to receive and position a work ring in registration with the restricted throat of said magazine whereby the end portion of a sheaf of commutator bars forced through said throat will be received and retained within the work ring, and transversely movable cutting means disposed in laterally offset relation to the throat-end of said magazine, said cutting means serving upon rotation of said magazine to sever the end portion of a sheaf of bars forced through said throat.

3. Apparatus for forming commutator annuli comprising a base provided with a pair of upstanding longitudinally spaced end members, a plurality of supporting bars extending longitudinally of the base and supported between the end members thereof, a tubular magazine carried longitudinally of said bars for rotational movement about its longitudinal axis, said magazine being formed with an elongated cylindrical chamber opening at one end to receive a tubular sheaf of commutator segment-forming bars and communicating at its opposite end with the larger end of a longitudinally tapered restricted throat disposed at one end of the magazine, a fluid-actuated longitudinally extensible ram hingedly mounted on one of said bars and movable into and out of axial alignment with the chamber of said magazine, said ram serving when positioned in axial alignment with said chamber and upon actuation to force an end portion of a sheaf of bars positioned in said chamber outwardly through said throat, fluid-actuated means carried by one of the end members of the base in longitudinal axial alignment with the throat-end of said magazine, said means being provided with a longitudinally movable socket adapted for the reception of a work ring, said means serving upon actuation to position a work ring carried by said socket in registration with the restricted end of said throat whereby the portion of a sheaf of bars forced therethrough will be inserted in and retained by said ring, a transversely movable cutting tool carried by one of said bars on a plane disposed substantially adjacent the restricted end of said throat, said tool serving upon rotation of said magazine to sever the end portion of a sheaf of bars forced through said throat, means for imparting rotation to said magazine, and means for supplying fluid under pressure to said ram and said fluid-actuated means.

4. Apparatus for forming commutator annuli comprising a frame, a tubular magazine mounted on said frame for rotational movement about its longitudinal axis, said magazine being formed with an axially disposed tubular chamber adapted for the reception of a sheaf of commutator segment-forming bars, said chamber terminating at one end in a longitudinally tapered restricted throat, means for imparting rotation to said magazine, a fluid-actuated longitudinally extensible ram hingedly mounted on said frame for swinging movement to a position in axial alignment with the chamber of said magazine, said ram serving upon actuation to enter said chamber to force a portion of a sheaf of bars positioned therein outwardly through said throat, a longitudinally movable socket adapter disposed in axial alignment with the restricted throat of said magazine, said adapter serving to receive and position a work ring in registration with the restricted throat of said magazine whereby the portion of a sheaf of commutator bars forced through said throat will be inserted in the ring, means for effecting the longitudinal movement of said socket adapter, and a transversely movable cutting tool disposed on a plane substantially adjacent the restricted throat of said magazine, said tool serving upon rotation of said magazine and upon transverse movement to sever the end portion of a sheaf of bars forced through said throat.

5. Apparatus for forming commutator annuli, comprising frame means; a tubular magazine element supported by the frame means having an inlet end and an outlet end and adapted to receive a tubular sheaf of segment-forming bars; a work ring; means forming a carrier for the work ring and disposed adjacent the outlet end of the magazine element, said carrier means and work ring being arranged in axial alignment with the sheaf; means for imparting relative movement to the magazine element, the sheaf and the carrier forming means for causing a portion of the sheaf to be extruded from the magazine element and inserted into the work ring; a cutting tool element carried by the frame means and disposed for cutting the extruded sheaf intermediate the outlet end of the magazine element and the work ring; means for imparting relative movement between the cutting element and the sheaf; and means for moving one of said elements transversely of the other for severing the sheaf intermediate the outlet end of the magazine and the work ring.

6. Apparatus for forming commutator annuli, comprising frame means; a tubular magazine element supported by the frame means having an inlet end and an outlet end and adapted to receive a tubular sheaf of segment-forming bars; a ram arranged axially of the sheaf and received at the inlet end of the magazine element and upon movement force a portion of the sheaf through the outlet end of the magazine element; means for imparting longitudinal movement to the ram; a work ring; means forming a carrier for the work ring and disposed adjacent the outlet end of the magazine element, said carrier means and work ring being arranged in axial alignment with the sheaf; means for imparting relative movement to the work ring carrier means and the sheaf for causing a portion of the extruded sheaf to be inserted into the work ring; a cutting tool element carried by the frame means and disposed for cutting the extruded sheaf intermediate the outlet end of the magazine element and the work ring; means for imparting relative movement between the cutting element and the sheaf; and means for moving one of said elements transversely of the other for severing the sheaf intermediate the outlet end of the magazine and the work ring.

7. Apparatus for forming commutator annuli, comprising frame means; a tubular magazine element supported by the frame means having an inlet end and an outlet end and adapted to receive a tubular sheaf of segment-forming bars; a work ring; a ram arranged in axial alignment with the sheaf at the outlet end of the magazine element and forming a carrier for the work ring; means for imparting relative movement to the magazine element, the sheaf and the ram for causing a portion of the sheaf to be extruded from the magazine element and inserted into the work ring; a cutting tool element carried by the frame means and disposed for cutting the extruded sheaf intermediate the outlet end of the magazine element and the work ring; means for imparting relative movement between the cutting element and the sheaf; and means for moving one of said elements transversely of the other for severing the sheaf intermediate the outlet end of the magazine and the work ring.

8. Apparatus for forming commutator annuli, comprising frame means; a tubular magazine element supported by the frame means having an inlet end and an outlet end and adapted to receive a tubular sheaf of segment-forming bars; a ram arranged axially of the sheaf and received at the inlet end of the magazine element and upon movement force a portion of the sheaf through the outlet end of the magazine element; a work ring; a second ram arranged in axial alignment with the sheaf at the outlet end of the magazine element and forming a carrier for the work ring; means for imparting relative movement to the rams for causing a portion of the sheaf to be extruded from the magazine element and inserted into the work ring; a cutting tool element carried by the frame means and disposed for cutting the extruded sheaf intermediate the outlet end of the magazine element and the work ring; means for imparting relative movement between the cutting element and the sheaf; and means for moving one of said elements transversely of the other for severing the sheaf intermediate the outlet end of the magazine and the work ring.

9. Apparatus for forming commutator annuli comprising frame means, a tubular magazine supported by the frame means and adapted to receive a tubular sheaf of segment-forming bars, means forming a socket for a work ring and disposed adjacent one end of the magazine, said socket being arranged in axial alignment with the magazine, means for imparting relative movement to the magazine, sheaf, and socket forming means for causing a portion of the sheaf to be ejected from the magazine and enter the work ring, a transversely movable cutting tool carried by the frame means, means for imparting relative rotary movement to the magazine and cutting tool, and means for moving the cutting tool transversely of the magazine.

10. Apparatus for forming commutator annuli comprising frame means, a tubular magazine supported by the frame means and adapted to receive a tubular sheaf of segment-forming bars, a ram arranged axially of the sheaf and arranged for engagement with one end of the sheaf for forcing the sheaf out of the magazine, means for imparting longitudinal movement to the ram, means forming a socket for a work ring disposed at the opposite end of the sheaf, means for imparting axial movement to the socket bearing means in alignment with the sheaf for causing an ejected portion of the sheaf to enter the work ring, a transversely movable cutting tool carried by the frame means, means for imparting relative rotary movement to the magazine and cutting tool, and means for moving the cutting tool transversely of the magazine.

11. Apparatus for forming commutator annuli comprising frame means, a tubular magazine supported by the frame means and adapted to receive a tubular sheaf of segment-forming bars; a ram arranged axially of the sheaf and arranged for engagement with one end of the sheaf for forcing the sheaf out of the magazine, means for imparting longitudinal movement to the ram, a second ram disposed in axial alignment with the magazine adjacent the other end of the sheaf, means for imparting axial movement to the second ram in alignment with the sheaf, said second ram being provided with a longitudinally extending socket for receiving a work ring, means for moving the second ram and causing an ejected portion of the sheaf to enter the work ring, a transversely movable cutting tool carried by the frame means, means for imparting relative rotary movement to the magazine and cutting tool, and means for moving the cutting tool transversely of the magazine.

12. Apparatus for forming commutator annuli, comprising frame means; a tubular magazine element supported by the frame means having an inlet end and an outlet end and adapted to receive a tubular sheaf of segment-forming bars; a work ring; means forming a carrier for the work ring and disposed adjacent the outlet end of the magazine element, said carrier means and work ring being arranged in axial alignment with the sheaf; means for imparting relative movement to the magazine element, the sheaf and the carrier forming means for causing a portion of the sheaf to be extruded from the magazine element and inserted into the work ring; a cutting tool element carried by the frame means and disposed for cutting the extruded sheaf intermediate the outlet end of the magazine element and the work ring; means for rotating the magazine element and sheaf; and means for moving one of said elements transversely of the other for severing the sheaf intermediate the outlet end of the magazine and the work ring.

13. Apparatus for forming commutator annuli, comprising frame means; a tubular magazine element supported by the frame means having an inlet end and an outlet end and adapted to receive a tubular sheaf of segment-forming bars; a work ring; means forming a carrier for the work ring and disposed adjacent the outlet end of the magazine element, said carrier means and work ring being arranged in axial alignment with the sheaf; means for imparting relative movement to the magazine element, the sheaf and the carrier forming means for causing a portion of the sheaf to be extruded from the magazine element and inserted into the work ring; a cutting tool element carried by the frame means and disposed for cutting the extruded sheaf intermediate the outlet end of the magazine element and the work ring; means for rotating the magazine element and sheaf; and means for moving the cutting element transversely of the sheaf for severing the sheaf intermediate the outlet end of the mazagine element and the work ring.

14. Apparatus for forming commutator annuli, comprising frame means; a tubular magazine element supported by the frame means having an inlet end and an outlet end and adapted to receive a tubular sheaf of segment-forming bars; a work ring; means forming a carrier for the work ring and disposed adjacent the outlet end of the magazine element, said carrier means and work ring being arranged in axial alignment with the sheaf; means for imparting relative movement to the magazine element, the sheaf and the carrier forming means for causing a portion of the sheaf to be extruded from the magazine element and inserted into the work ring; a cutting tool element carried by the frame means and disposed for cutting the extruded sheaf intermediate the outlet end of the magazine element and the work ring; means for imparting cutting movement to the cutting element; and means for moving the cutting element transversely of the sheaf for severing the sheaf intermediate the outlet end of the magazine element and the work ring.

15. Apparatus for forming commutator annuli, comprising a frame, a tubular magazine mounted on said frame for rotational movement about its longitudinal axis, said magazine being formed with a tubular chamber having an inlet end and an outlet end and adapted for the reception of an elongated tubular sheaf of segment-forming bars, means for imparting rotation to the magazine, a ram axially aligned with said chamber in the magazine and upon actuation adapted to enter the inlet end of the chamber to force a portion of a sheaf of bars, contained within the magazine, through the outlet end of the chamber, a second ram disposed in axial alignment with said magazine adjacent the outlet end of the magazine, a work ring carried by the second ram at the end confronting said outlet end of the magazine, said second ram when actuated being adapted to position the work ring adjacent the outlet end of the magazine, a cutting tool mounted for movement transversely of the axis of the sheaf between the outlet end of the magazine and the cutting ring for severing a portion of a sheaf forced through the outlet end of the magazine, and means for actuating the rams and said cutting tool.

PAUL W. NIPPERT.

No references cited.